US008870172B2

(12) United States Patent
Yu et al.

(10) Patent No.: US 8,870,172 B2
(45) Date of Patent: Oct. 28, 2014

(54) TEST SUPPORT APPARATUS

(75) Inventors: Meng-Bin Yu, Wuhan (CN); Yang Chen, Wuhan (CN); Wei Liang, Wuhan (CN); Yu-Lin Liu, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 396 days.

(21) Appl. No.: 13/268,165

(22) Filed: Oct. 7, 2011

(65) Prior Publication Data

US 2012/0187057 A1    Jul. 26, 2012

(30) Foreign Application Priority Data

Jan. 25, 2011  (CN) .......................... 2011 1 0026893

(51) Int. Cl.
*B23Q 3/02* (2006.01)
*G01M 99/00* (2011.01)
*G01M 7/02* (2006.01)

(52) U.S. Cl.
CPC .............. *G01M 99/00* (2013.01); *G01M 7/027* (2013.01)
USPC ............................................. 269/91; 269/55

(58) Field of Classification Search
USPC ........................................ 269/91, 55, 58, 69
See application file for complete search history.

(56) References Cited

U.S. PATENT DOCUMENTS

| 3,643,935 | A  | * | 2/1972 | Bell ................................. 269/16 |
| 5,599,183 | A  | * | 2/1997 | Razdolsky et al. ............. 433/53 |
| 5,816,568 | A  | * | 10/1998 | Fox .................................. 269/60 |
| 8,342,495 | B2 | * | 1/2013 | Weissenborn ................ 269/101 |
| 2008/0066519 | A1 | * | 3/2008 | Potter et al. ..................... 72/372 |
| 2010/0084800 | A1 | * | 4/2010 | Uhal et al. .................... 269/271 |
| 2010/0164158 | A1 | * | 7/2010 | Weissenborn ................ 269/101 |
| 2012/0187057 | A1 | * | 7/2012 | Yu et al. .......................... 211/26 |
| 2013/0087961 | A1 | * | 4/2013 | Weissenborn .................. 269/45 |

* cited by examiner

*Primary Examiner* — Lee D Wilson
(74) *Attorney, Agent, or Firm* — Novak Druce Connolly Bove + Quigg LLP

(57) ABSTRACT

A test support apparatus includes a supporting mechanism supporting a product, a holding post pressed on the product, a positioning assembly, an operating member and a clamping member. The positioning assembly is attached to the supporting mechanism and the holding post. The positioning assembly includes a positioning member and a moving member. The moving member is attached to the holding post, and moveably relative to the positioning member to adjust a distance between the holding post and the supporting mechanism. The operating member is rotatably attached to the positioning member. The clamping member is rotatably attached to the operating member and rotatable relative to the operating member about a first axis. The clamping member engaged with the supporting mechanism, and the operating member is rotatable relative to the positioning member about a second axis to rotate the clamping member about the first axis to disengaged from the supporting mechanism.

20 Claims, 5 Drawing Sheets

TEST SUPPORT APPARATUS

BACKGROUND

1. Technical Field

The present disclosure relates to a test support apparatus.

2. Description of Related Art

Electronic apparatus, such as computers, often need to go through various tests, such as vibration testing or impact test. When the computers are tested, the computers are secured to a test support apparatus by a plurality of screws, which is labor intensive and time-consuming.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
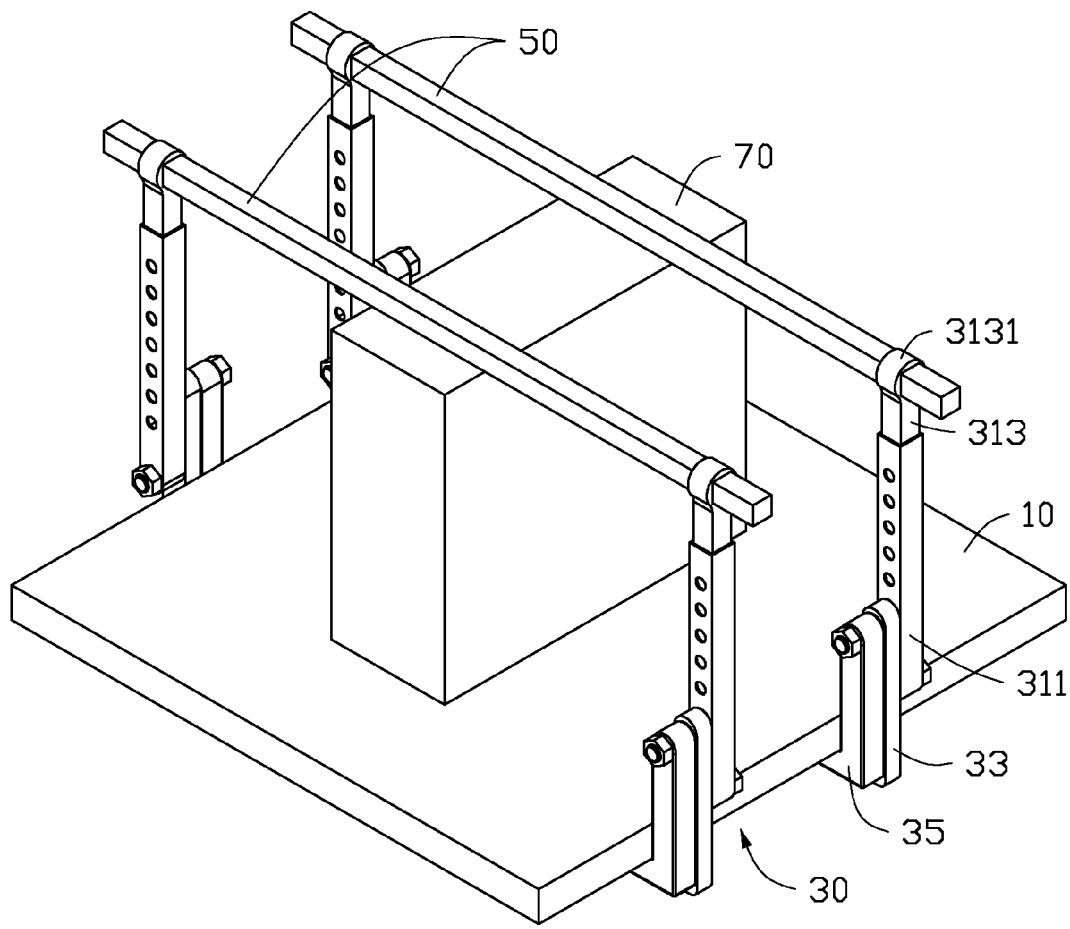
FIG. 1 is an isometric view of a test support apparatus and a product in accordance with an embodiment, and the positioning devices are in a closed position.
Figure 2:
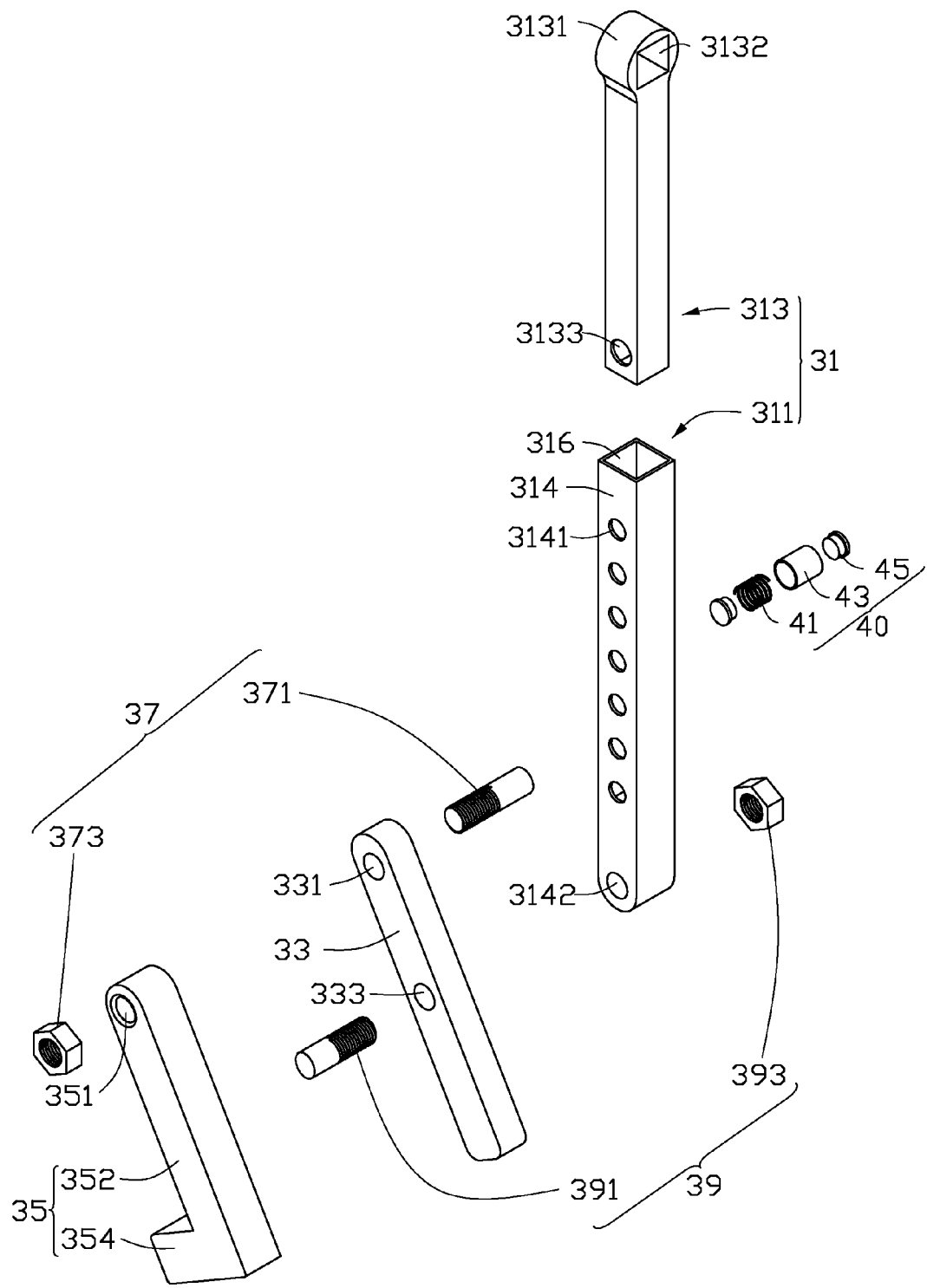
FIG. 2 is an exploded, isometric view of a positioning device of the test support apparatus of FIG. 1.

Referring to FIGS. 1 and 2, a test support apparatus in accordance with an embodiment includes a supporting mechanism 10, four positioning devices 30 attachable to the supporting mechanism 10, and two holding posts 50. Each holding post 50 is attached to two of the four positioning device 30. In one embodiment, the test apparatus is used to secure a product 70 (such as a computer enclosure). The supporting mechanism 10 is rectangular panel, and a cross-section of each holding post 50 is rectangular. One of ordinary skill in the art will also realize that the present disclosure is not limited to the configuration of the supporting mechanism 10 and the holding post 50. Rather, other configurations are contemplated by the present disclosure, for example, the supporting mechanism 10 is round, and the holding post 50 is a column.

Each positioning device 30 includes a positioning assembly 31, an operating member 33, a clamping member 35 rotatably attached to the operating member 33, a first securing member 37, and a second securing member 39. The positioning assembly 31 includes a positioning member 311 and a moving member 313 moveably received in the positioning member 311. In one embodiment, a cross-section of the positioning member 311 is rectangular, and a cross-section of the moving member 313 is also a rectangle. The positioning member 311 includes two first side panels 314 parallel to each other, and two second side panels 316 parallel to each other. The two first side panels 314 and the second side panels 316 cooperatively define a receiving space to receive the moving member 313. The bottoms of the two first and second side panels 314,316 are connected to cover an end of the positioning member 311.

A plurality of positioning holes 3141 and a pivot hole 3142 are defined in each first side panel 314 (only one first side panel 314 shown in FIG. 2). The plurality of positioning holes 3141 is arranged a straight line, and the pivot hole 3142 is located below the plurality of positioning holes 3141 and adjacent to the bottom of the positioning member 311. In one embodiment, the distance between adjacent positioning holes 3141 is equal.

A retaining portion 3131 extends from a first end of the moving member 313, and a receiving hole 3133 is defined in the second end of the moving member 313. The retaining portion 3131 defines a retaining hole 3132. In one embodiment, the retaining hole 3132 is rectangular. A resilient device 40, received in the receiving hole 3133, includes a resilient member 41, a case 43 receiving the resilient member 41, and two fasteners 45 mounted to the opposite ends of the case 43.

The operating member 33 defines a mounting hole 331 and a rotating hole 333. The rotating hole 333 is corresponding to the pivot hole 3142. A securing hole 351, corresponding to the mounting hole 331, is defined in the clamping member 35. In one embodiment, the clamping member 35 is L-shaped and includes a first clamping portion 352 and a second clamping portion 354 substantially perpendicular to the first clamping portion 352.

The first securing member 37 includes a first securing post 371 with screw threads and a first nut 373 secured to the securing post 371. The second securing member 39 has a same configuration as the first securing member 37, and includes a second securing post 391 and a second nut 393.

Figure 3:
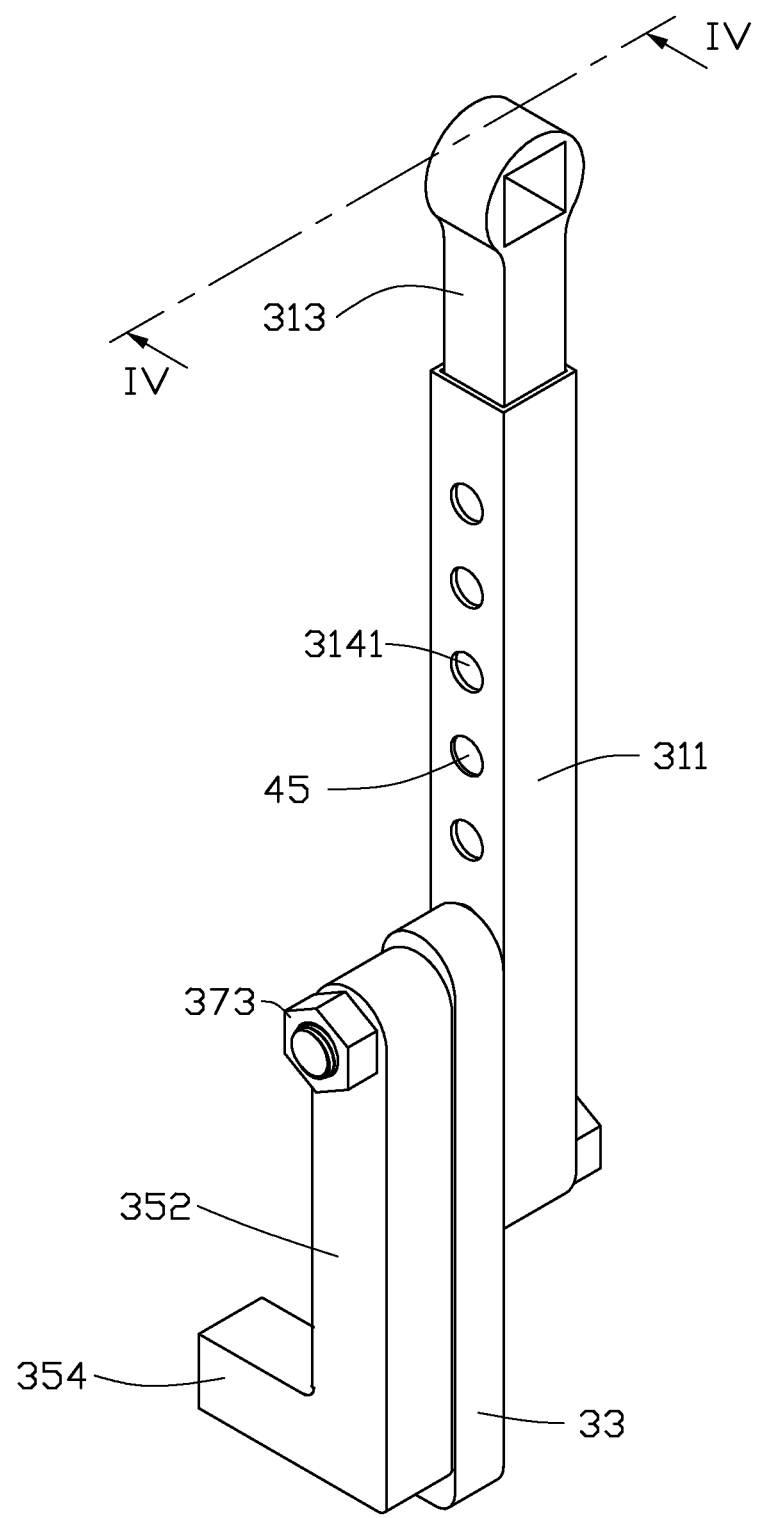
FIG. 3 is an assembled view of FIG. 2.
Figure 4:
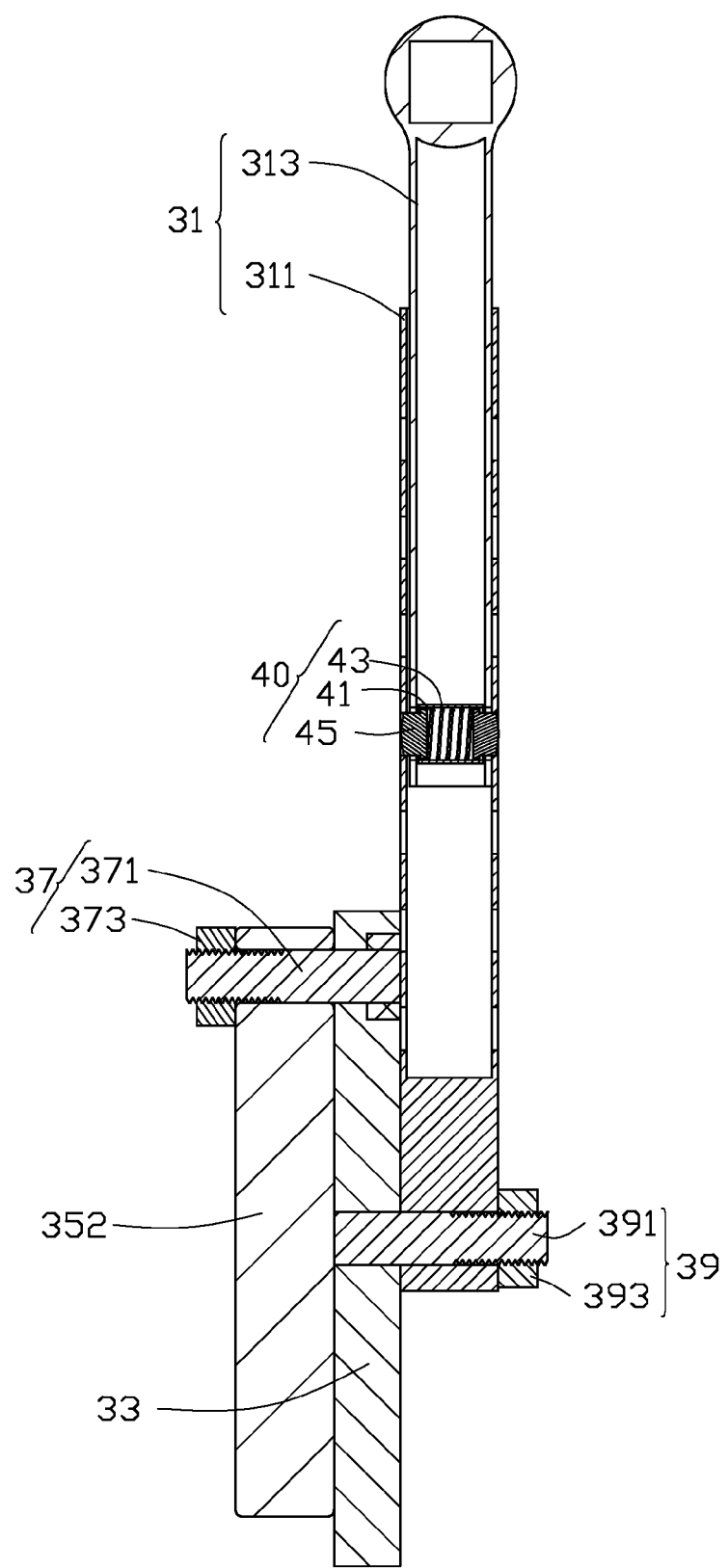
FIG. 4 is a cross-sectional view in an enlarged scale taken along line IV-IV of FIG. 2.

Referring to FIGS. 3-4, in assembly of the positioning device 30, the resilient member 41 is received in the case 43. The case 43 is received in the receiving hole 3133. The two fasteners 45 are secured to the opposite ends of the case 43, and each fastener 45 abuts against the resilient member 41, to secure the resilient device 40 to the moving member 30.

The moving member 313 is received in the positioning member 311 and pushed downward. Each first side panel 314 presses each fastener 45 to move in a first direction, away from the each first side panel 314, to deform the resilient member 41. When the resilient device 40 is reached to one of the plurality of positioning holes 3141, the resilient member 41 is released to move each fastener 45 in a second direction opposite to the first direction, until the two fasteners 45 is engaged in the corresponding positioning holes 3141. In this way, the two fasteners 45 can be engaged in any one of the plurality of positioning holes 3141, so that a distance between the retaining portion 3131 and the positioning member 311 can be adjusted.

The operating member 33 abuts one of the two first side panel 314, and the rotating hole 333 is aligned with the pivot holes 3142. The second securing post 391 is engaged in the rotating hole 333 and the pivot holes 3142, and the second nut 393 is engaged with the second securing post 391, to rotatably secure the operating member 371 to the positioning member 311.

The clamping member 35 abuts against the operating member 33, and the securing hole 353 is aligned with the mounting hole 331. The first securing post 311 is engaged in the securing hole 353 and the mounting hole 331, and the first nut 373 is engaged with the first securing post 371, to rotatably secure the clamping member 373 to the operating member 371.

Referring to FIGS. 1-4, the four positioning devices 30 are distributed into two pairs. The two pairs of the positioning devices 30 are located on opposite sides of the supporting mechanism 10, respectively. Each holding post 50 is engaged in the two corresponding retaining holes 3132. Therefore, the two hold posts 50 can be secured to the four positioning devices 30. In one embodiment, each positioning assembly is substantially perpendicular to the supporting mechanism 10, and each holding post 50 is substantially parallel to the supporting mechanism 10.

Figure 5:
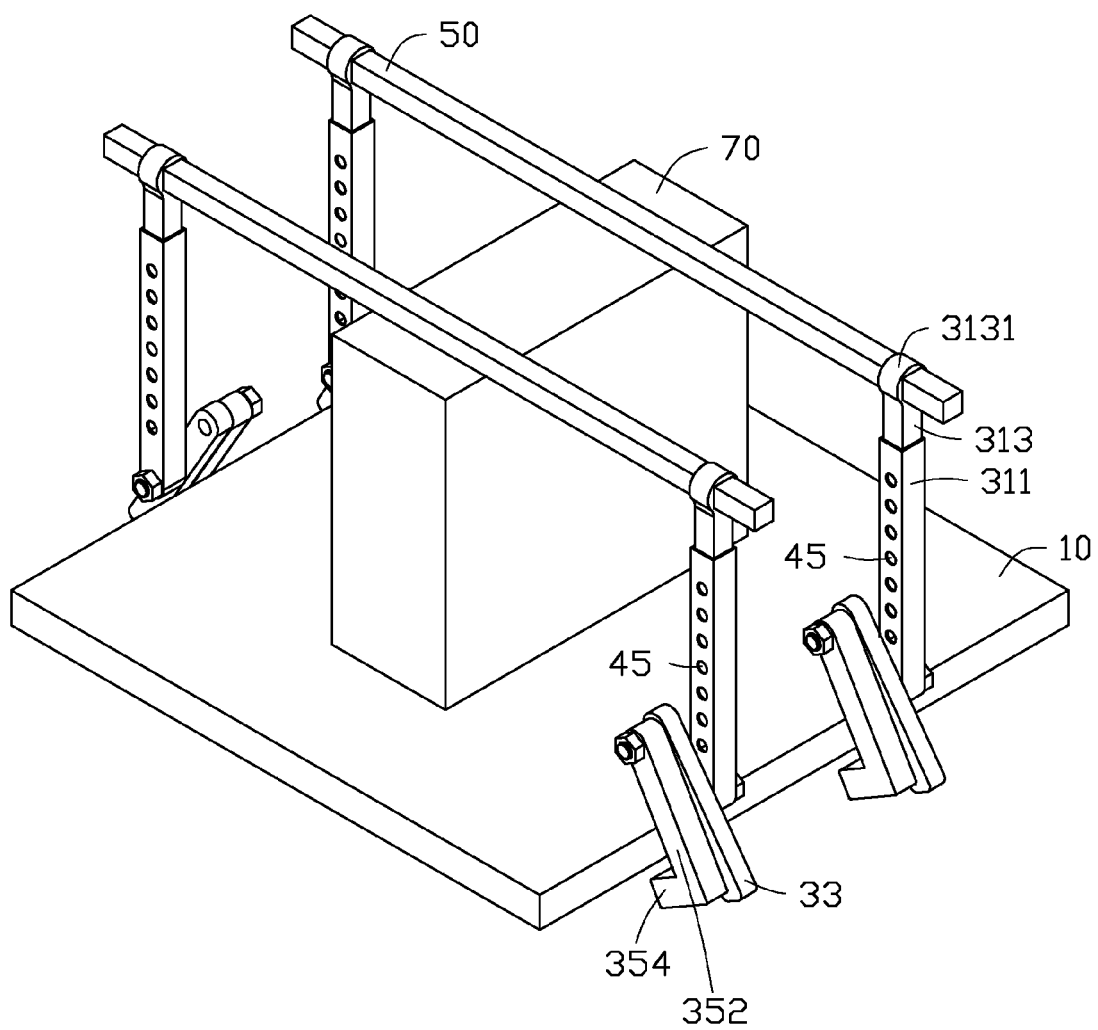
FIG. 5 is similar to FIG. 1, and the positioning devices are in an open position.

The operating member 33 is operated and rotated about the second securing member 39, to rotate the clamping member 35 about the first securing member 37 relative to the positioning member 311 between a closed position (see FIG. 1) and an open position (see FIG. 5). In the closed position, the clamping member 35 is clipped to the supporting mechanism 10, the operating member 33 and the first clamping portion 352 are substantially perpendicular to the supporting mechanism 10, and the second clamping portion 351 abuts the bottom surface of the supporting mechanism 10. In the open position, the clamping member 35 is clear through the supporting mechanism 10. A sharp angle is defined between the operating member 33 and the supporting mechanism 10, a sharp angle is also defined between the first clamping portion 352 and the supporting mechanism 10, and the second clamping portion 351 is disengaged from the supporting mechanism 10. In one embodiment, the clamping member 35 can be supported by a supporting device, such as a desk.

In use, the product 70 is placed on the supporting mechanism 10. The moving member 313 is moved downwards relative to the positioning member, until the two holding posts 50 are pressed on the product 70. The operating member 33 is operated and rotated about the second securing member 39, to rotate the clamping member 35 about the first securing member 37, until the clamping member 35 and the operating member 33 are in the closed position. Therefore, the product 70 can be stably positioned on the supporting mechanism 10 and for testing.

When the product 70 is detached from the supporting mechanism 10, the operating member 33 is operated and rotated about the second securing member 39, to rotate the clamping member 35 about the first securing member 37, until the clamping member 35 and the operating member 33 are in the open position. Then the clamping member 35 can be disengaged from the supporting mechanism 10. The two holding posts 50 are moved upward, and the four positioning devices 30 can be detached from the supporting mechanism 10. Therefore, the product 70 can be freed from the supporting mechanism 10.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A test support apparatus comprising:
a supporting mechanism supporting a product;
a holding post pressed on the product;
a positioning assembly located between the supporting mechanism and the holding post; an operating member attached to the positioning assembly; and
a clamping member attach to the operating member and rotatable relative to the operating member about a first axis; the clamping member comprising a first clamping portion and a second clamping portion substantially perpendicular to the first clamping portion;
wherein the operating member is rotatable relative to the positioning assembly about a second axis to rotate the clamping member about the second axis between a closed position and an open position, in the closed position, the clamping member is engaged with the supporting mechanism, the first clamping portion is substantially perpendicular to the supporting mechanism, and the second clamping portion is located on a bottom surface of the supporting mechanism; in the open position, the clamping member is disengaged from the supporting mechanism, an acute angle is defined between the first clamping portion and the supporting mechanism, and the second clamping portion is disengaged from the supporting mechanism.

2. The test support apparatus of claim 1, wherein the positioning assembly is substantially perpendicular to the supporting mechanism.

3. The test support apparatus of claim 1, wherein the first axis is located at an end of the operating member, and the second axis is located near a middle portion of the operating member.

4. The test support apparatus of claim 1, wherein a securing hole is defined in an end of the first clamping portion, a mounting hole is defined in the end of the operating member, a first securing member is engaged in the securing hole and the mounting hole to secure the first clamping portion to the operating member, and the first axis is the first securing member.

5. The test support apparatus of claim 4, wherein a rotating hole is defined in the middle portion of the operating portion, a pivot hole is defined in an end of the operating member, a second securing member is engaged in the rotating hole and the pivot hole to secure the operating member to the positioning assembly, and the second axis is the second securing member.

6. The test support apparatus of claim 1, wherein the positioning assembly comprises a positioning member and a moving member, the positioning member is engaged with the clamping member, and the moving member is moveably received in the positioning member.

7. The test support apparatus of claim 6, wherein a direction of the moving member moved relative to the positioning member is substantially perpendicular to the supporting mechanism.

8. The test support apparatus of claim 6, wherein a plurality of positioning holes is defined in the positioning member, and a resilient device, attached to the moving member, is received in one of the plurality of positioning holes.

9. The test support apparatus of claim 8, wherein the resilient device comprises a resilient member and a fastener abutting the resilient member, the fastener is received in the one of the plurality of positioning holes, and the resilient member is deformable when the fastener is disengaged from the one of the plurality of positioning holes.

10. The test support apparatus of claim 8, wherein the plurality of positioning holes is arranged in a straight line.

11. A test support apparatus comprising:
a supporting mechanism supporting a product;
a holding post pressed on the product;
a positioning assembly comprising a positioning member and a moving member moveably received in the positioning member; the moving member attached to the holding post, wherein the moving member is moveably relative to the positioning member to adjust a distance between the holding post and the supporting mechanism;
an operating member rotatably attached to the positioning member; and
a clamping member rotatably attached to the operating member and rotatable relative to the operating member about a first axis; the clamping member engaged with the supporting mechanism;
wherein the operating member is rotatable relative to the positioning member about a second axis to rotate the clamping member about the first axis to disengaged from the supporting mechanism.

12. The test support apparatus of claim 11, wherein the first axis is located at an end of the operating member, and the second axis is located near a middle portion of the operating member.

13. The test support apparatus of claim 11, wherein the clamping member comprises a first clamping portion and a second clamping portion substantially perpendicular to the first clamping portion, the second clamping is located on a bottom surface of the supporting mechanism when the clamping member is engaged with the supporting mechanism, and an acute angle is defined between the first clamping portion and the supporting mechanism when the clamping member is disengaged from the supporting mechanism.

14. The test support apparatus of claim 11, wherein a direction of the moving member moved relative to the positioning member is substantially perpendicular to the supporting mechanism.

15. The test support apparatus of claim 11, wherein the positioning member comprises two first side panels and two second side panels, and the two first side panels and the two second side panels cooperatively define a receiving space to receive the moving member.

16. The test support apparatus of claim 15, wherein a cross section of the positioning member is rectangular.

17. The test support apparatus of claim 15, wherein a plurality of positioning holes is defined in the each side panel, and a resilient device, attached to the moving member, is received in one of the plurality of positioning holes.

18. The test support apparatus of claim 17, wherein the resilient device comprises a resilient member and a fastener abutting the resilient member, the fastener is received in the one of the plurality of positioning holes, and the resilient member is deformable when the fastener is disengaged from the one of the plurality of positioning holes.

19. The test support apparatus of claim 17, wherein the plurality of positioning holes is arranged in a straight line.

20. The test support apparatus of claim 11, wherein a securing hole is defined in an end of the first clamping portion, a mounting hole is defined in the end of the operating member, a first securing member is engaged in the securing hole and the mounting hole to secure the first clamping portion to the operating member, and the first axis is the first securing member.

* * * * *